W. Harvey,
Wheel Cultivator.
No. 79,570. Patented July 7, 1868.
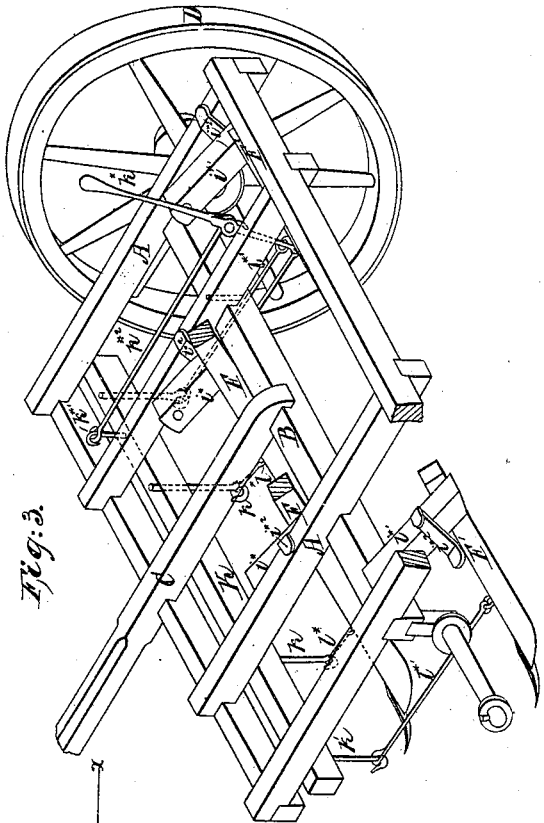
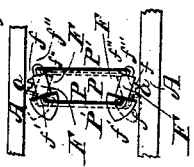
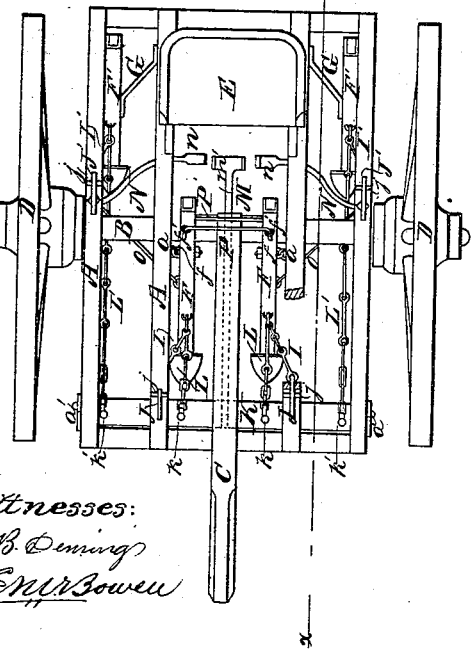
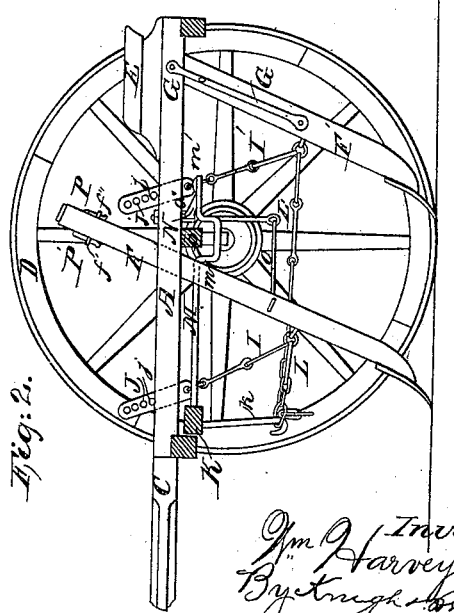
Witnesses:
W. B. Deming
E. M. Bowen
Inventor:
Wm. Harvey
By Knight Bros
Attorneys

United States Patent Office.

WILLIAM HARVEY, OF VOLGA CITY, IOWA.

Letters Patent No. 79,570, dated July 7, 1868.

IMPROVEMENT IN SULKY-CULTIVATOR.

*The Schedule referred to in these Letters Patent and making part of the same.*

TO ALL WHOM IT MAY CONCERN:

Be it known that I, WILLIAM HARVEY, of Volga City, in the county of Clayton, and State of Iowa, have invented certain new and useful Improvements in Sulky-Cultivators; and I do hereby declare that the following is a sufficiently full, clear, and exact description thereof, to enable one skilled in the art to which my said invention appertains to make and carry it into effect, reference being had to the accompanying drawings, which form a part of this specification.

The subject of my invention is a sulky or wheel-cultivator, in which the shovels are capable of being dodged, elevated, and adjusted by the driver while in his seat on the frame, and in which the inner shovels are adapted to be so held as to throw the dirt either toward or away from the plants, as desired.

My improvements consist—

First, in the novel combination and arrangement of the devices for supporting, dodging, and raising the shovels; and Second, in a simple device for holding the inner shovels at different angles relatively to the row, for the purpose of throwing the dirt either toward or away from the plants.

In the drawings—

Figure 1 is a plan view of my improved cultivator, a portion of the frame being broken away to more fully illustrate the arrangement of some of its parts.

Figure 2 is a longitudinal section on the line $x\,x$, fig. 1.

Figure 3 is a perspective view of a modification of my cultivator, a portion of the frame and one of the supporting-wheels being removed to expose the parts behind them.

Figure 4 is a diagram representing in detail the manner of adjusting the inner shovels.

Similar letters of reference indicate corresponding parts in the several figures.

A may represent the frame, which may be of any suitable form to afford attachment for the different parts.

B is the axle-tree, C the tongue, D the wheels, and E the driver's seat.

F F may represent the front or inner shovels, and F' F' the rear or outside ones. The former, F, are connected to the frame by means of the staples $f$ and $a$, so as to allow them to be turned in any desired direction, devices being employed to impart said motions to them, and hold them in the desired positions, as will be hereinafter described; the latter ones, F', are pivoted to the frame, and supported against lateral movement by braces G.

I I' are chains, connecting the lower ends of the shovels F and F' to perforated straps J J', which are supported by being passed through slots in the frame, as shown in fig. 1, and having a wooden pin, $j$, inserted in one of their perforations above said frame, the vertical adjustment of said pin in the perforations of said straps regulating the working depth of the shovels.

K is a rock-bar, pivoted in lugs $a'$ at the front of the frame, and having depending from its lower side, arms $k\,k'$, to the lower ends of which are secured, by hooks, (as shown, or otherwise,) chains L L', connecting them respectively to the shovels F and F'.

M is a lever, projecting rearward from the rock-bar K, at about right angles to its depending arms. It is, if necessary, bent at $m$, to allow its movement to extend above the axle-tree, and is provided at its loose extremity with a treadle, $m'$, within convenient reach of the driver's foot. By depressing this treadle, the shovels are simultaneously raised and suspended, for riding over obstructions, or going to and from the field.

N N are a pair of bent levers, pivoted at the outer edge of the frame A, in brackets $a''$, their lower arms being connected by bars or chains O to the inner shovels F, for the purpose of dodging them, to avoid plants, and their upper members forming treadles $n$, which, being depressed by the foot of the driver, impart this movement.

The upper ends of the inner shovels, F, are provided on their front and rear sides with staples $f'\,f''$, for the reception of hooks P P', of different length, by the change of which, as illustrated in fig. 4, the shovels are turned, so as to throw the dirt toward or away from the row, the black lines in said figure representing the position of the hooks and shovel-standards when arranged to throw the dirt toward, and the red lines their positions when throwing it away from the row.

In fig. 3, the rock-bar K is shown as being hinged to the lower sides of the frame, and its motion imparted to it by a lever, $k^*$, connected to an arm, $k^{*1}$, of said rock-bar, by a rod, $k^{*2}$. The shovel-standards F and F' are supported by being swivelled and pivoted respectively to pivoted bars $i^*$ $i^{*1}$, the swinging movement of which is limited by slides or clutches $i^{*2}$, and the elevating-chains L L' supplaced by bars $l^*$ $l^{*\prime}$.

Having thus described my invention, the following is what I claim as new, and desire to secure by Letters Patent:

1. The combined arrangement of the shovels F F', supporting-chains I I', perforated straps J J', and wooden pins $j$, the rock-bar K $k$ $k^1$, elevating-chains L L', and treadle M $m'$, and the dodging-chains O, and treadles N, all as represented and described, for the purpose set forth.

2. The hooks P P', employed, in combination with the inner shovels F F, to adjust said shovels relatively to the row, substantially as and for the purpose specified.

To the above specification of my invention, I have signed my hand, this 14th day of March, 1868.

WILLIAM HARVEY.

Witnesses:
    S. T. WOODWARD,
    C. M. NAGLE.